United States Patent [19]
Whited

[11] 3,786,329
[45] Jan. 15, 1974

[54] DYNAMIC BRAKE
[75] Inventor: James Sidney Whited, Radford, Va.
[73] Assignee: Kollmorgan Corporation, Hartford, Conn.
[22] Filed: Jan. 31, 1973
[21] Appl. No.: 328,295

[52] U.S. Cl. ............................................. 318/379
[51] Int. Cl. ............................................. H02p 3/12
[58] Field of Search................... 318/258, 261, 273, 318/275, 364, 366, 368, 375, 379, 459

[56] References Cited
UNITED STATES PATENTS
3,463,991  8/1969  Yuminaka et al. ................. 318/379
3,501,684  3/1970  Webb............................ 318/379 X Primary Examiner—Bernard A. Gilheany
Assistant Examiner—W. E. Duncanson, Jr.
Attorney—George B. Finnegan, Jr. et al.

[57] ABSTRACT

In a full wave rectified control circuit for a D-C motor comprising two banks of silicon controlled rectifiers for forward and reverse operation, there is provided a pulse generation system which applies a firing signal to each of the control SCR's when the power to the motor is lost. A short circuit is thereby provided for the motor armature through the control circuit and the rotational energy of the motor is rapidly dissipated to effect dynamic braking.

4 Claims, 3 Drawing Figures

DYNAMIC BRAKE

BACKGROUND OF THE INVENTION

It is well known that a rotating D-C motor generates a voltage within its armature which is opposite in polarity to the supply voltage. This voltage or back emf provides an effective means to facilitate braking of a rotating motor because the current flowing as a result of short circuiting this voltage when the power to the motor is disconnected, creates a strong magnetic force in opposition to rotation. There have heretofore been many devices developed which utilize this braking phenomena which is generally referred to as dynamic braking.

PRIOR ART

Many attempts have been made to provide mechanical switching means on a motor to apply a closed circuit to the back emf when the motor has been disconnected from its supply. Due to the high currents involved in dynamic braking, the mechanical method is limited because of arcing and the resulting failure of the moving parts.

With the advent of solid state components, there have been developed many systems which provide electronic switching means to apply a short circuit to the motor back emf. However, these systems generally require complex additional circuitry beyond the normal control systems associated with D-C motors with resulting increased cost.

For example, one of these systems is described in U.S. Pat. No. 3,463,991, Yuminaka et al. The motor herein is provided with a full wave rectified supply consisting of a control circuit having forward and reverse current passing banks of silicon control rectifiers. Dynamic braking is provided in this patented system by a separate diode bridge circuit which is connected to the armature terminals, the short circuit path, being through the separate bridge circuit and not through the control circuit.

It is an object of this invention to provide an inexpensive, simple, and effective method of utilizing the motor control circuit components to provide a short circuit for the back emf of a D-C motor to provide dynamic braking when the motor is disconnected from its source without the need of additional short circuit forming components.

BRIEF DESCRIPTION OF THE INVENTION

The control circuit of the subject invention provides full wave rectified power to a D-C motor by virtue of two banks of silicon controlled rectifiers. One of said banks passes full wave rectified power in the forward motor direction and the other passes full wave rectified power in the reverse motor direction. Each bank has two SCR's connected to the motor and to opposite sides of the power supply. The gate terminals of each SCR are connected to a pulse generator circuit which transmits firing pulses to all the SCR's simultaneously upon removal of the main power supply. A path for the current generated by the back emf of the motor is thereby provided through either the forward or reverse rectifier bank.

BRIEF DESCRIPTION OF THE DRAWING

The instant invention is more fully described in conjunction with the appended drawing which shows a preferred embodiment of the invention and in said drawing.

THE PREFERRED EMBODIMENT

Figure 1:
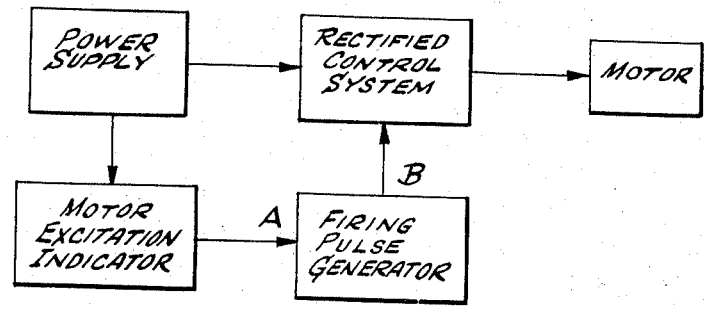
FIG. 1 is a block diagram of the main components of the invention.
Figure 2:
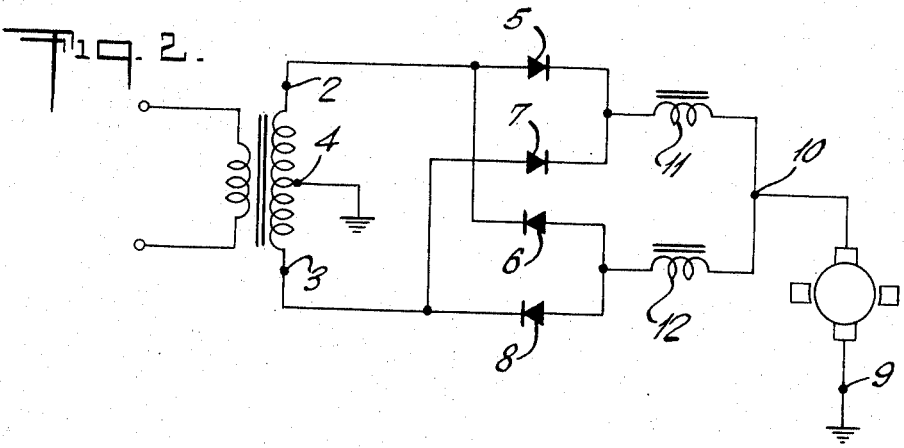
FIG. 2 is a circuit diagram showing a typical single phase full wave rectifier system.

The basic systems associated with the preferred embodiment of this invention are shown in the block diagram of FIG. 1. Referring to FIG. 2, the power supply may be a standard alternating current source which is connected to the control circuit by means of an isolation transformer 1 having terminals 2 and 3 and center tap 4. Transformer terminal 2 is connected to forward current conducting SCR 5 and to reverse current conducting SCR 6. Transformer terminal 3 is connected to forward current conducting SCR 7 and to reverse current conducting SCR 8. The center tap of the transformer is connected to motor armature terminal 9 which may be the common reference or ground. Forward SCR's 5 and 7 are connected to the motor armature terminal 10 through smoothing inductance 11. Reverse SCR's 6 and 8 are connected to the motor armature terminal 10 through smoothing inductance 12.

Figure 3:
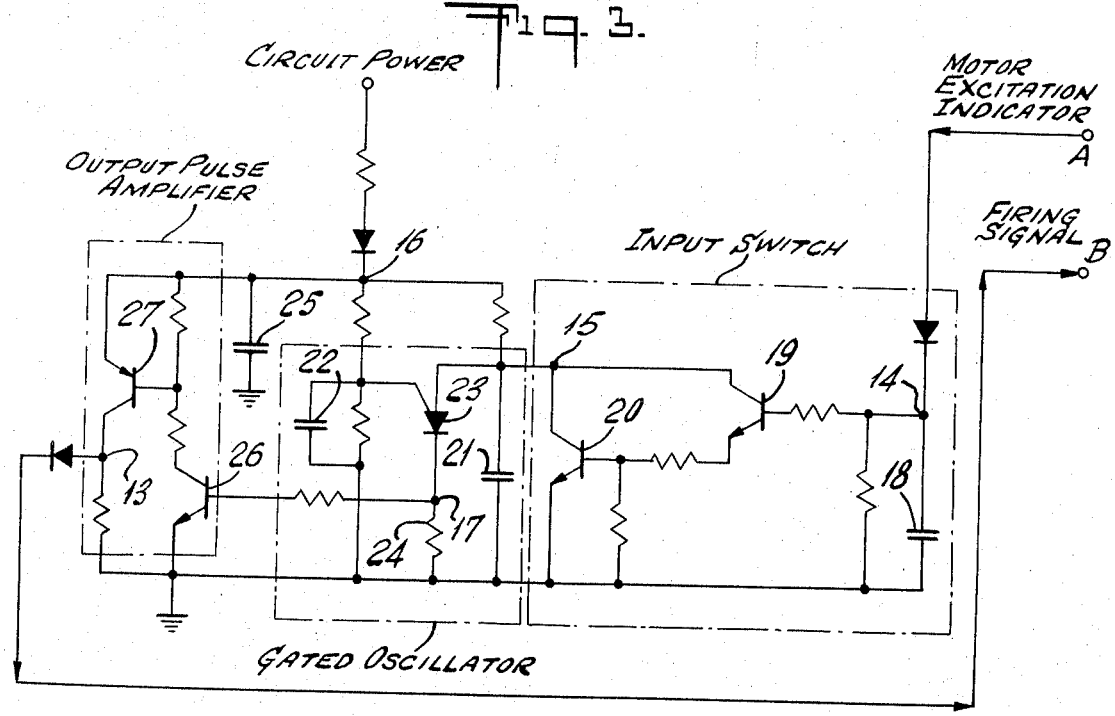
FIG. 3 is a circuit diagram showing a generator system of the type employed in the preferred embodiment.

The gate terminals of the SCR are coupled to terminal 13 of the pulse generator circuit illustrated in FIG. 3. Although there are many functionally equivalent arrangements which can be used, the circuit of FIG. 3 has been found to be particularly effective. This circuit can best be described by reference to terminals 13, 14, 15, 16 and 17.

An input switching circuit utilizing transistors 19 and 20 is connected at terminal 14 across capacitor 18 which receives a signal indicating that power is on from a motor excitation indicator associated with the power supply. A gated oscillating circuit having capacitors 21 and 22, programmable unijunction transistor 23 and resistor 24 is connected to switching circuit terminal 15 across the emitter and collector of transistor 20 and is controlled by input switching transistors 19 and 20. Capacitor 25 is connected at oscillating circuit terminal 16 and is charged by a 24 volt D-C source to provide power for operation of the pulse generator circuit when power to the motor is interrupted. The output amplifier circuit of transistors 26 and 27 is coupled to resistor 24 at terminal 17 through the base of transistor 26.

OPERATION

Referring to FIG. 3, as long as motor power is on a positive voltage is present at terminal 14 which is applied by the power supply motor excitation indicator and may be simply the line voltage which is rectified and clipped to an appropriate magnitude. This voltage maintains capacitor 18 in a charged condition thereby rendering transistors 19 and 20 conductive. Capacitor 18 also prevents premature firing caused by transient noise. As long as transistor 20 is conducting, capacitor 21 cannot charge and the oscillating circuit remains inoperative because it is effectively shunted by transistor 20.

When the power supply is disconnected, the positive voltage at terminal 14 drops as capacitor 18 discharges, thereby rendering transistors 19 and 20 nonconductive. Capacitor 21 will then charge forcing the anode of programmable unijunction transistor 23 to become more positive than the gate thereby causing transistor 23 to fire. A pulsating voltage will therefore be set up across resistor 24 and these pulses will be amplified by transistors 26 and 27 and applied to the gate terminals of SCR's 5, 6, 7, and 8, permitting them to conduct and thereby closing the short circuit for the back emf.

When the motor is disconnected from its supply, the back emf generated by rotation of the armature is still present. Since all SCR's are fired at this time just described, a conductive path is presented to the back emf and a current will therefore flow through the smoothing inductances 11 or 12 and the secondary winding of transformer 1. This current will create a magnetic field which generates a torque acting to oppose rotation of the motor, thereby bringing it to a rapid stop.

In this manner, the invention provides a very simple system for effectively short circuiting the motor armature and thereby providing a closed path for the back emf present therein. This system may be equally effective in a half wave rectified control system and by slight modification or by providing additional pulse generator circuits, it can be adapted to multiple phase systems.

I claim:

1. A dynamic brake system for a rotating D-C motor having a back emf built up therein comprising:
   A. a power supply;
   B. a control circuit connected to the power supply and to the motor to provide rectified power to the motor;
   C. a gated rectifying network in the control circuit which is rendered conductive by a firing signal and is connected to provide a closed looped path for the motor back emf when fired; and
   D. means for generating the firing signal connected to the rectifier network, said means being coupled to be responsive to an interruption of power to the motor such that the rectifying network is rendered conductive in the event of such interruption.

2. A dynamic brake system for a rotating D-C motor having a back emf built up therein as described in claim 1 wherein the control circuit and rectifying network comprise:
   A. an isolating power transformer connected to the power supply having first and second output terminals and a center tap; the center tap being connected directly to one side of the motor;
   B. first and second forward current passing SCR's connected to the first and second transformer terminal respectively and to the other side of the motor through a smoothing inductance; and
   C. first and second reverse current passing SCR's connected to the first and second transformer terminals respectively, and to the other side of the motor through a smoothing inductance.

3. A dynamic brake system for a rotating D-C motor having a back emf built up therein as described in claim 1 wherein the means for generating the firing signal comprises:
   A. an oscillating circuit;
   B. a switching circuit connected to the oscillating circuit being responsive to interruption of power to the motor to turn on the oscillating circuit; and
   C. an amplifier circuit connected to amplify pulses from the oscillating circuit and to apply them to the rectifying network.

4. A dynamic brake system for a rotating D-C motor having a back emf built up therein comprising:
   A. a power supply;
   B. an isolating transformer connected to the power supply having first and second terminals and a center tap, the center tap being connected directly to one side of the motor;
   C. first and second forward current passing SCR's connected to the first and second transformer terminals respectively and to the other side of the motor through a smoothing inductance;
   D. first and second reverse current passing SCR's connected to the first and second transformer terminals respectively and to the other motor terminal through a smoothing inductance;
   E. an oscillating circuit connected to the gates of the SCR's through an amplifier circuit to apply firing pulses to said gates; and
   F. a switching circuit connected to the oscillating circuit being responsive to interruption of power to the motor to turn on the oscillating circuit.

* * * * *